US006225897B1

(12) United States Patent
Doyle et al.

(10) Patent No.: US 6,225,897 B1
(45) Date of Patent: May 1, 2001

(54) TELEPHONE IN-USE INDICATOR SYSTEM

(75) Inventors: Eamon K. Doyle, Chicago; Gordon L. Helm, Lake Zurich, both of IL (US)

(73) Assignee: Gordon Helm, St. Joseph, MI (US)

( * ) Notice: Subject to any disclaimer, the term of this patent is extended or adjusted under 35 U.S.C. 154(b) by 0 days.

(21) Appl. No.: 09/030,116

(22) Filed: Feb. 25, 1998

(51) Int. Cl.[7] ....................................................... B60Q 1/26

(52) U.S. Cl. ........................ 340/468; 340/438; 340/457; 340/461

(58) Field of Search ................................... 340/468, 426, 340/425.5, 438, 439, 457, 461

(56) References Cited

U.S. PATENT DOCUMENTS

| 5,566,224 | * | 10/1996 | ul Azam et al. ................ 379/58 |
| 5,666,103 | * | 9/1997 | Davis, Jr. ...................... 340/479 |
| 5,704,707 | * | 1/1998 | Gebelein et al. .............. 362/106 |
| 5,910,764 | * | 6/1999 | Hayden ......................... 340/479 |

* cited by examiner

Primary Examiner—Nina Tong
(74) Attorney, Agent, or Firm—Katten Muchin Zavis

(57) ABSTRACT

A warning system for notifying others that a cellular telephone is in use in a vehicle. The system includes a transmitter electrically coupled to a cellular telephone for transmitting an in-use signal when the telephone is activated. A receiver for receiving the in-use signal. An indicator, responsive to the receiver receiving the in-use signal, for visually indicating that a cellular telephone is in use in a vehicle.

19 Claims, 5 Drawing Sheets

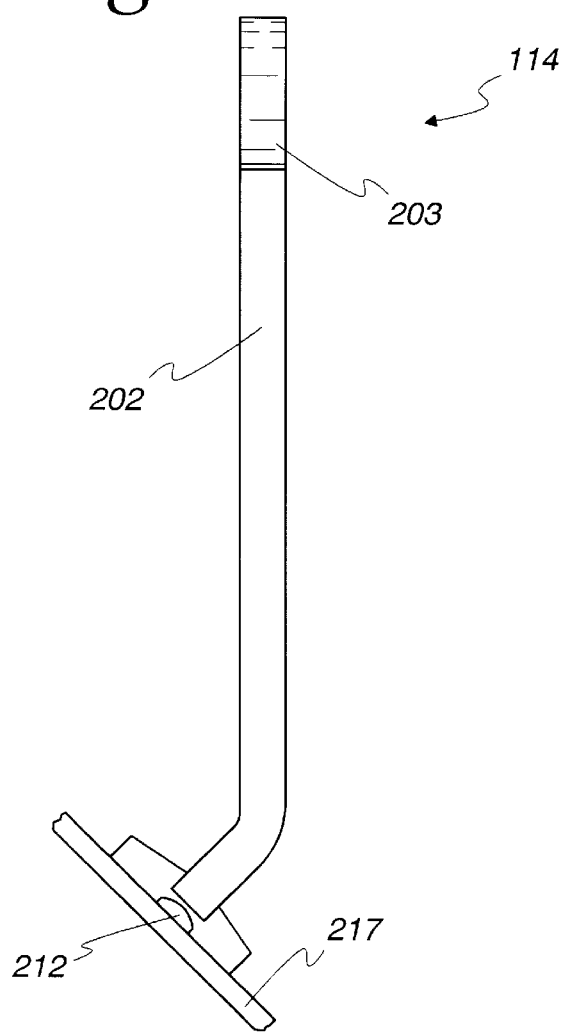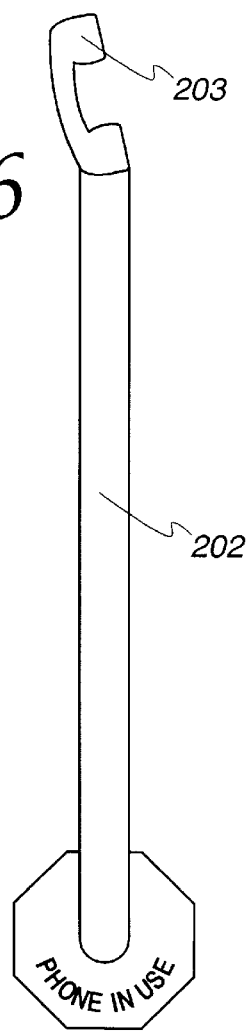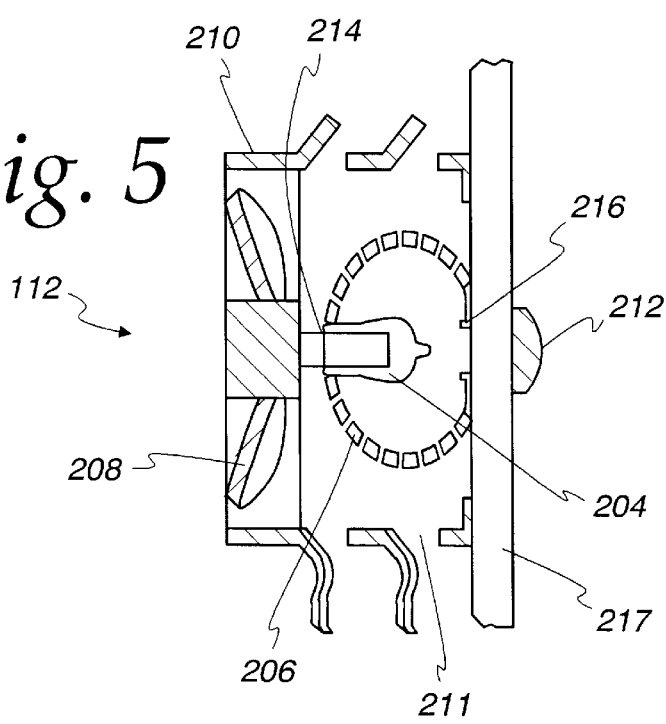

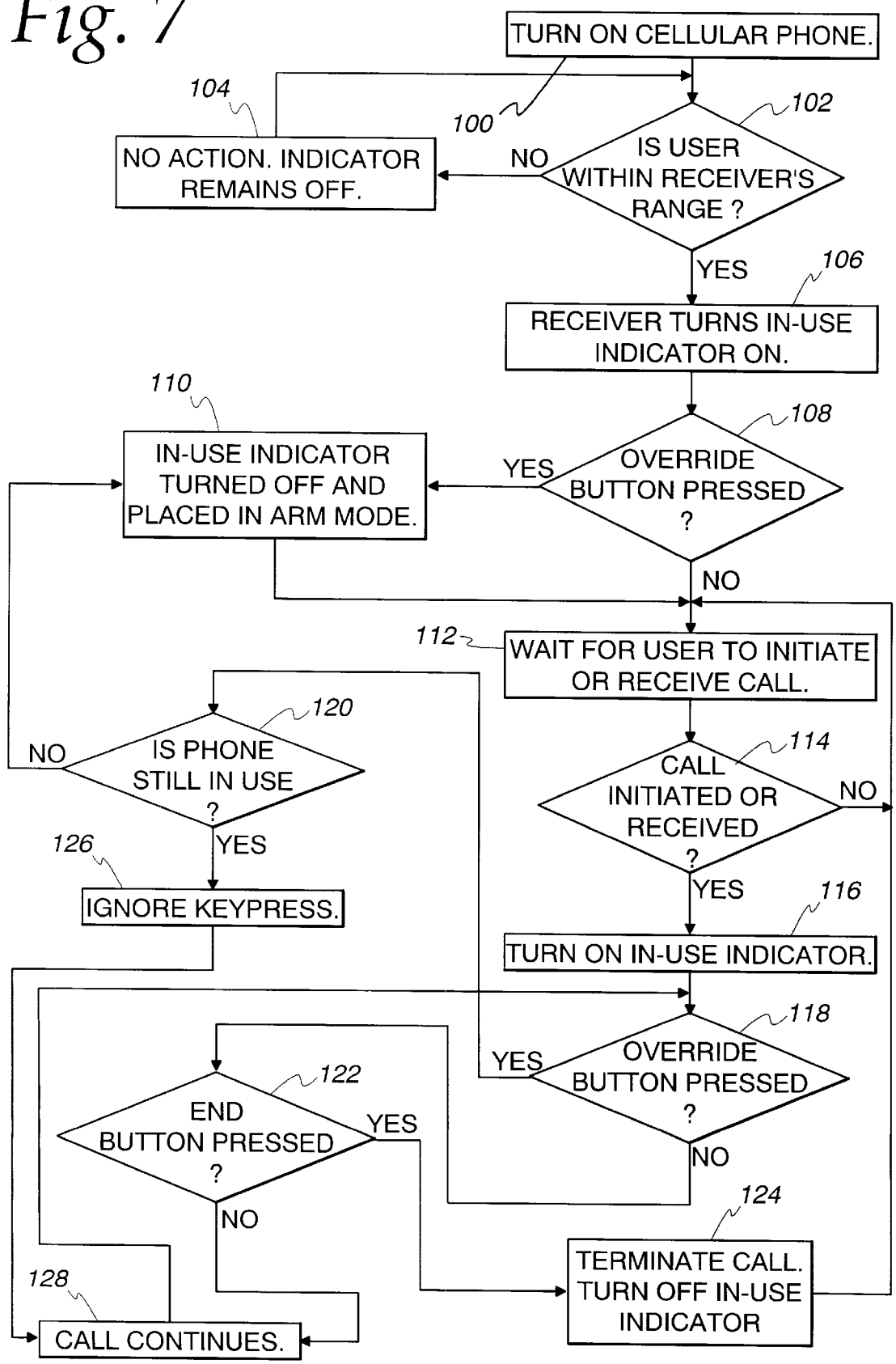

TELEPHONE IN-USE INDICATOR SYSTEM

BACKGROUND OF THE INVENTION

1. Field of the Invention

This invention generally relates to a telephone in-use indicator system and, more particularly, to an in-use indicator for providing visual notice to others that a cellular telephone device is in use, for e:ample in a vehicle.

2. Description of the Prior Art

It is well known that cellular telephones are becoming increasingly popular in the United States and abroad. In particular, the number of such telephone users has steadily increased over the past decade or so, and in particular, at a 40% to 50% annular rate over the last several years. Currently, there are over 50 million cellular, including digital PCS, telephone users in the United States, with another 50 million additional users expected by the year 2000. While many prospective owners cite security as the most compelling reason for purchasing a cellular telephone, it has been observed that, increasingly, such telephones are used for social and/or business related functions.

The cellular telephone has undoubtedly proven itself to be a very useful communications tool. However, because many cellular telephone users engage in conversation or answer and place calls while driving a vehicle, cellular telephone usage by drivers of automobiles while driving has also proven to be a dangerous distraction for drivers. Several possible reasons exist which may help explain the reason for such distractions. In particular, a driver, upon receiving notification of a call in the automobile, may oftentimes have to take his eyes of the road to pick up the phone, press a generally small sized button to answer the call, and then engage in conversation Furthermore, the driver may sometimes also have to deal with the distraction of fumbling with the radio controls, either before or after picking up the telephone call, to silence the radio. In addition, the ringing of the phone in itself may momentarily startle a driver.

As such, it has been shown that cellular telephone usage by the driver of an automobile results in a significantly higher chance of that driver causing and/or being involved in a car accident such as a collision. Automobile collisions are a leading cause of death in North America and account for about one fatality every ten minutes. The risk of a collision when using a cellular telephone, as noted by The New England Journal of Medicine, is four to five times greater than when a cellular telephone is not in use while driving, which is roughly equivalent to a person driving while intoxicated. Furthermore, the risk factor did not differ between hand-held and hands-free telephones.

Unfortunately, one of the recurring tragedies in such collisions is that the vehicle being driven by the cellular telephone operator may cause one or more other unsuspecting vehicles to also be involved in the collision. As such, not only may the driver operating the cellular telephone be injured or killed, but drivers and passengers of the other vehicles also involved in the collision may likewise be affected.

Therefore, there is a need for a telephone in-use system that not only is able to reduce the level of distraction for the vehicle driver, thereby promoting responsible driving by cellular telephone users, but is also able to provide a measure of safety to other drivers on the road.

SUMMARY OF THE INVENTION

Briefly, the present invention relates to a system for notifying others that a cellular telephone is in use in a vehicle. The telephone in-use system includes a transmitter for transmitting an in-use signal when the telephone is activated. A receiver is provided to receive the in-use signal. An indicator, responsive to the receiver receiving the in-use signal, is provided for visually indicating that a cellular telephone is in use. In a particular embodiment of the invention, when a cellular telephone is used inside a car, boat, airplane or other vehicle, an indicator may light to warn others that a cellular telephone is being used inside the vehicle.

BRIEF DESCRIPTION OF THE DRAWINGS

Other features, objects and advantages of the present invention will become readily apparent and understood upon consideration of the following detailed description and attached drawings, wherein:

FIG. 4 is a diagram of a side view of the external portion of the in-use indicator in accordance with the present invention.

FIG. 5 is a section of the internal portion of the in-use indicator in accordance with the present invention.

FIG. 6 is a rear view of the in-use indicator in accordance with the present invention.

FIG. 7 is a flow diagram illustrating the operation of the phone in-use system in accordance with the present invention.

DETAILED DESCRIPTION OF THE INVENTION

The present invention is a system for providing visual notice to others that a cellular telephone device is in use in a vehicle, such as a car, truck, boat, airplane, or other vehicle. Notification and warning to other automobile drivers is providing by an in-use indicator on the vehicle that automatically lights up when a cellular telephone is in use in the vehicle, thereby warning other drivers on the road that a cellular telephone is in-use inside the automobile. Other drivers may then accordingly proceed with caution when approaching a vehicle having a lighted in-use indicator. The in-use indicator system is a relatively small and inexpensive device that may be mounted on a car without requiring any permanent modifications to the car, but is clearly visible to other cars from a significant distance when lit.

It is also contemplated that the present information may be used in airplanes. In particular, it is known that personal cellular phone use in an airplane, even when the airplane is on the ground, is generally prohibited. Enforcement, however, is potentially difficult. However, the present invention enables the in-use indicator to be installed, for example, in the cockpit where a pilot may quickly see if an unauthorized cellular phone is being used.

Thus, an important aspect of the invention relates to providing a visual warning to other drivers on the road that a particular automobile has an active cellular phone and that defensive driving techniques may be required.

Another important aspect of the invention relates to providing a simple device that may be quickly and inexpensively mounted to any vehicle with virtually no modifications to the vehicle.

Still another important aspect of the invention relates to generally providing a visual indicator to indicate that a cellular telephone is in-use.

Figure 1:
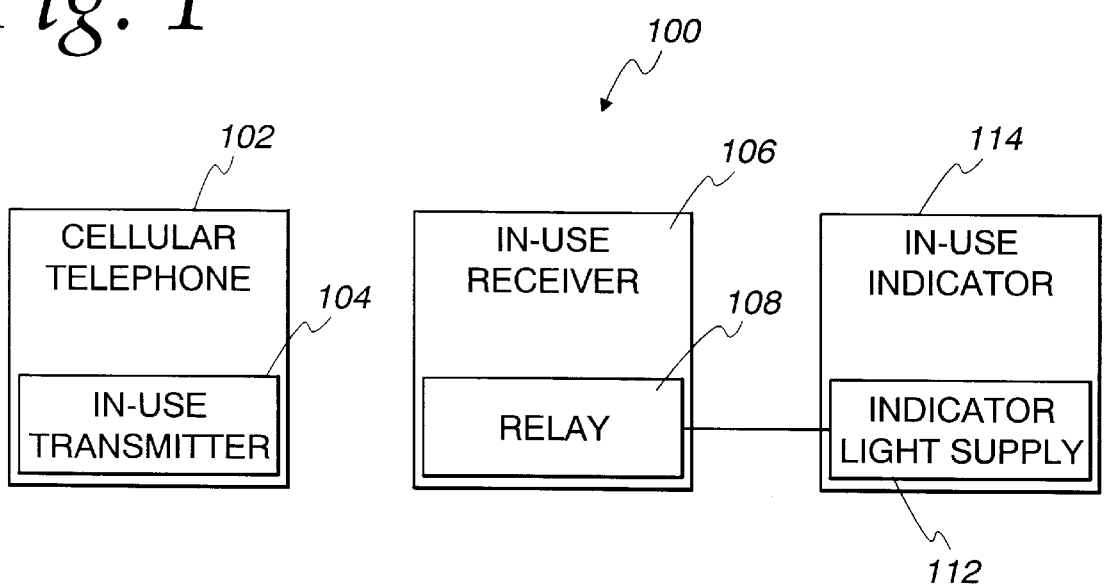
FIG. 1 is an overall block diagram of the phone in use system in accordance with the present invention.

Turning now to the drawings, and with particular attention to FIG. 1, a block diagram illustrating a phone in-use indicator system, generally referred to by the reference numeral 100, according to a particular embodiment of the present invention is shown. The in-use indicator system 100 includes a conventional cellular telephone 102 provided with a second transmitter, such as an in-use transmitter 104 for transmitting an in-use signal when the telephone is either turned on or when a call is placed or received. An in-use receiver 106 is provided for receiving the in-use signal from the transmitter 104 in the cellular phone or directly from the cellular service tower. In addition, the in-use receiver 106 is also provided with one or more relays 108 to support high current warning devices, such as a light. In particular, as shown in the present exemplary embodiment, the relay 108 may be electrically coupled to an indicator light supply unit 112 to provide light to an in-use indicator 114 for displaying to others that a cellular phone is either on or in-use.

The cellular telephone 102 may be any commonly available cellular telephone, such as the Tele T*A*C 200 cellular telephone available from Motorola of Schaumburg, Ill., which is shown and described by way of example only. It is to be noted that any standard cellular telephone may generally be used and, in particular, it is contemplated that the present invention may be integrated into the design of the cellular phone. It should also be noted that although a commonly available remote keyless entry (RKE) transmitter 104, such as available from Bulldog, Model #1302, is shown and described in the exemplary embodiment, any low cost radio frequency (RF) or infra red (IR) transmitter that transmits a coded signal may be used as an in-use signal transmitter. A coded signal is desired in the present embodiment to prevent signals from one person's in-use indicator system from triggering a warning light in another person's vehicle. It should be noted that an RF or IR transmitter that transmits unencoded signals may be used as well. However, power levels must be adjusted in such instances to prevent triggering warning lights in other vehicles, as mentioned above. Alternatively, the receiver may be designed such that only relativeLy strong signals will trigger the warning light.

The receiver 106 may be any RF, cellular or IR receiver, such as a cellular receiver available from Motorola, model TeleTAC 200, or an RKE receiver, available from Radio Shack of Ft. Worth, Texas, part number 49-851, which is shown and described by way of example only. The transmitter 104 may operate from the power available from the cellular telephone battery (not shown). Similarly, the receiver 106 may operate from the power available from the car battery (not shown).

Figure 2:
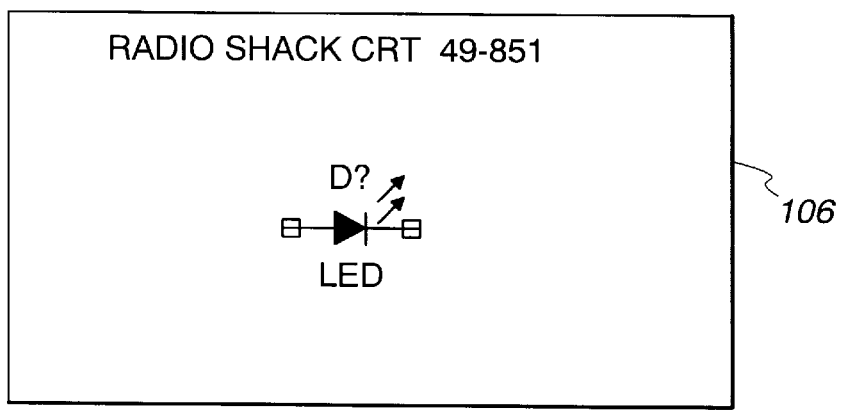
FIG. 2 is a schematic diagram illustrating the connection of the transmitter to the cellular phone.

Referring to FIG. 2, the cellular telephone 102 is shown interfaced to the in-use signal transmitter 104. The cellular telephone 102 is used to generate the signals necessary to enable the appropriate RF codes to be sent by the transmitter 104, as described below, in order to operate the in-use indicator system 100.

In known cellular telephones, the in-use signal line 150 is connected to an in-use indicator, such as an liquid crystal display (LCD) or light emitting diode (LED) 152. Thus, when the cellular telephone establishes contact with the cell tower, e.g. goes in-use, the LED 152 lights and/or blinks.

The in-use signal source 150, i.e. the signal line leading to the in-use LED 152 or other in-use indicator on the cellular telephone, is connected to the activate button 162 of the transmitter 104 via transistor 158. The transistor may be any commonly available transistor such as a 2N3904.

In the present invention, the in-use signal line 150 is also connected to the resistor 156 which provides current to the transistor 158 through the resistor 156. Therefore, when the in-use signal is activated, the signal provides current through the resistor 156 to activate the transistor 158. Once transistor 158 is active, current flows to the activate button 162 of transmitter 104 and an activate signal is transmitted.

In actual use, typical cellular phones perform a quick power on self test. During that time, a test in-use signal is generated, thereby causing the in-use LED 152 to briefly turn on. This test in-use signal causes an activate signal to be transmitted by the transmitter 162 to the receiver 106, thereby causing the in-use indicator 114 (FIG. 1) to become lit. In the present embodiment, the in-use indicator 114 will light each time the cellular phone 102 is powered on and will stay lit until the in-use indicator 114 is manually overridden. If the in-use indicator 114 is desired to be overridden until a call is initiated or received, then the override button 166 on the transmitter 104 may be used as an arm button to turn the in-use indicator 114 off and to wait for a call to be placed or received before turning on once again.

Optionally, a timer (not shown) can be used such that the in-use indicator 114 does not light when the test in-use signal is generated.

Accordingly, an override button 166 on the transmitter 104 is connected to a diode 160, which is in turn connected to the power button 155 of the cellular phone 102. Therefore, pressing the override button 166 causes an override signal to be transmitted by the transmitter 104. Diode 160 is provided to prevent the cellular phone from turning off when the override button 166 is pressed.

Thus, upon pressing the override button 166, the in-use indicator 114 will turn off. When a call is answered or placed, an in-use signal will once again be generated by the cellular telephone 102, which in turn will cause the activate button 164 to transmit an activate signal. This will cause the in-use indicator 114 to once again turn on. If the operator of the cellular phone attempts to override the in-use indicator 114 by pressing the off button 166 while the telephone is being used, the system will ignore the keypress and the in-use indicator 114 will remain lit.

If the cellular telephone 102 is turned on, but is not in use, before entering the vehicle, or if the cellular telephone 102 is generally outside the range of the receiver 106, the in-use indicator 114 will not light when the cellular telephone 102-Ls brought near the receiver 106. In such an instance, the in-use indicator 114 will remain off until the in-use signal is once again generated such as when a call is answered or initiated by the caller. In particular, when a call is received by the cellular telephone 102, the driver must press a send key or some other key on the cellular telephone to answer the call. By doing so, the in-use signal is generated, thereby causing the in-use indicator 114 to light, as mentioned above.

In an optional or additional embodiment of the invention, the in-use indicator system 100 may be turned on by the ringing of the cellular telephone 102. In particular, a resistor 157, may be connected to the ring signal 159 of the cellular phone 102 through an optoisolator 172, such as a 4N27QT, available from DigiKey Electronics. Thus, the in-use indicator 114 will light immediately after the cellular telephone 102 begins ringing. A particular advantage of such an embodiment is that the in-use indicator 114 lights immediately upon receipt of a call and does not require an in-use signal to be generated first. Therefore, the in use-indicator 114 is lit during the period of time the driver may possibly be distracted by having to fumble around to press the send button to answer the call. It should be noted that the opto-isolator 172 is used to enable the ring signal to remain as pristine as possible by limiting the amount of circuitry being connected to the signal. Other circuitry also may be used to accomplish the same principal.

In another optional or additional embodiment of the invention, as further shown in FIG. 2, the in-use indicator system 100 is implemented such that the in-use indicator 114 will turn off when the call is terminated upon receiving an end signal generated by the press of the end button 168 on the cellular telephone 102. Otherwise, the in-use indicator 114 will stay lit as long as the telephone remains turned on.

In particular, the end button 168 of the cellular telephone 102 may also be connected to the override button 166. Pressing the end button 168 will therefore cause an override signal to be generated by the override button 166 of the transmitter 104. Therefore, pressing the end button 168 will not only terminate the call, but will also turn off the in-use indicator 114. Accordingly, after concluding a conversation, pressing the end button 168 on the cellular telephone will end the conversation and turn off the in-use indicator 114 without requiring the phone to be turned off.

Figure 8:
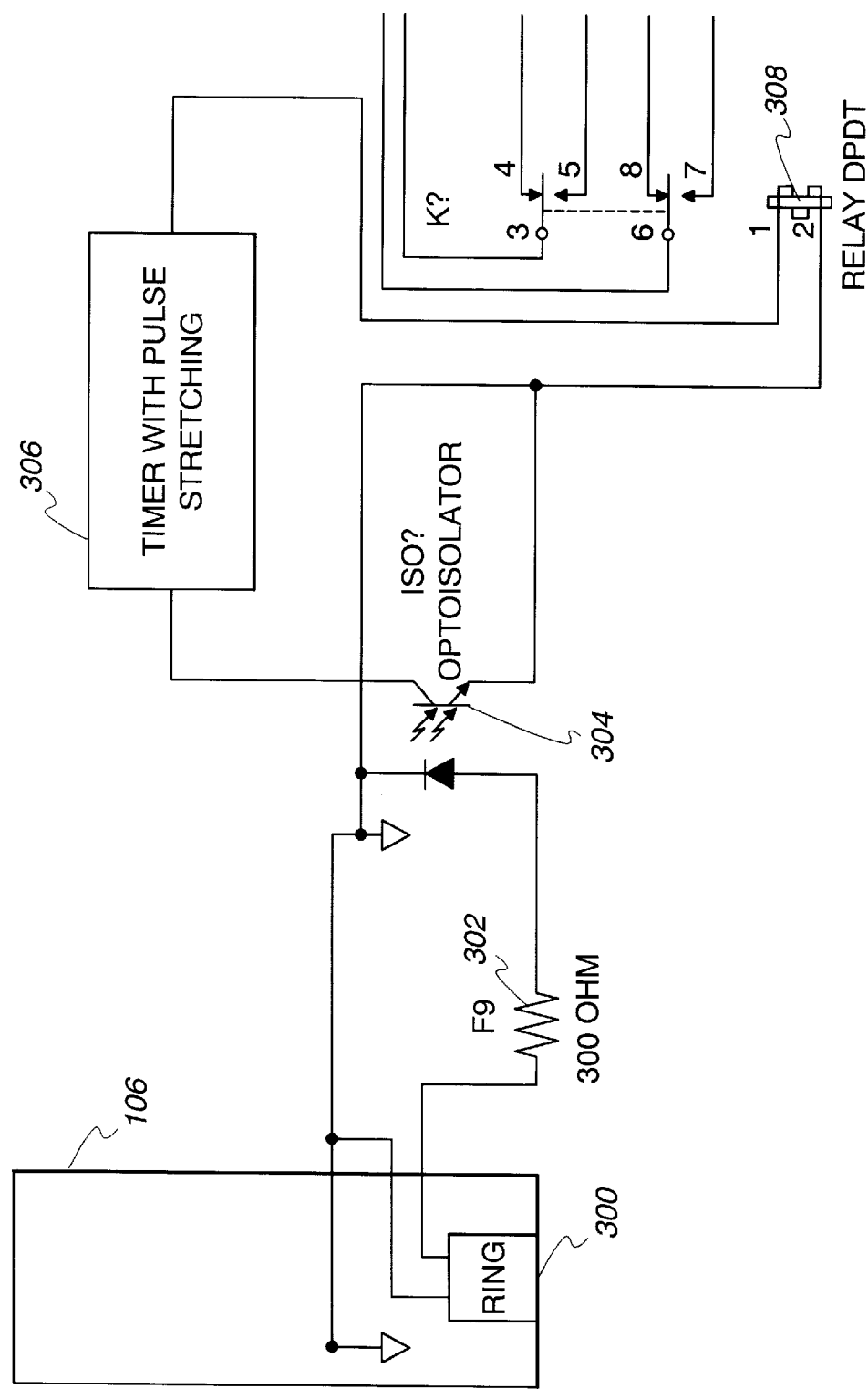
FIG. 8 is a schematic diagram illustrating the connection of an alternate receiver to the in-use indicator.

Referring to FIG. 8, in the instance where the cellular receiver is being used instead of the RKE receiver to turn on the in-use indicator 114, the receiver 106 responds to a cellular tower transmitted ring signal request or status bit to turn the in-use indicator 114 on. In particular, a resistor 300 may be connected to the ring signal of the receiver 106 through an opto-isolator 304 The opto-isolator 308 may then be connected to a double pull-double throw (DPDT) relay 308 to turn on the in-use indicator 114 and/or to mute a radio in the automobile or turn one or more other items on or off as desired. Thus, the in-use indicator 114 will activate after receiving a ring request signal from the cellular tower.

In such an implementation, control software for the cellular tower would require the addition of several logic states. In particular, when the cellular tower is ringing the user's cellular telephone, the in-use indicator 114 activate signal would be issued as a separate ring request signal by the cellular tower, using either the user's cellular telephone number or a second cellular telephone number, to which the cellular receiver 106 would be responsive. In addition, when a user's phone issues a send command, the cellular tower would then issue the in-use indicator 114 ring request signal to also turn on the in-use indicator 114. Finally, the cellular tower, upon receiving an end signal or signal lost state, would discontinue the in-use indicator 114 ring request.

It should be noted that the ring signal request, which is transmitted by the cellular tower to the receiver 106, may be substituted for a unique status bit to which the receiver 106 responds. This would eliminate the requirement for a second cellular telephone number since the receiver would then operate as described above, but instead would be based on the receiver 106 receiving the status bit. A particular advantage of such an implementation is the decreased chance of interference with the ring circuit in the user's cellular telephone.

Optionally, the cellular receiver 106 circuit may also be implemented with a timer 306 for pulse stretching. In particular, the timer 306 simply prevents the periodic nature of the ring signal from causing the in-use indicator 114 to flash or and off. This is accomplished by delaying, e.g. stretching, the period until the next pulse is received. This ensures that in-use indicator 114 remains lit constantly and does not follow the period of the ring signal. Once the pulses cease to be received by the receiver 106, the circuit will time out and the in use indicator 114 will turn off.

Referring once again to FIG. 2, in the present example, it should be noted that in the described exemplary cellular telephone 102 the end button 168 is multiplexed. Accordingly, a decoder (not shown) may be used to isolate the end signal. The output of the decoder may then be connected to the override button 166 of the transmitter 104 to enable the system to work properly as described above. Alternatively, during manufacture of a cellular telephone, the microprocessor responsible for handling the operation of the phone may be programmed such as to make the end signal available as a pin output. As such, the override button could then be interfaced to the proper pin output of the microprocessor. Furthermore, many of the above described functions could very easily be adapted to be provided in the firmware of the cellular telephone 102.

Figure 3:
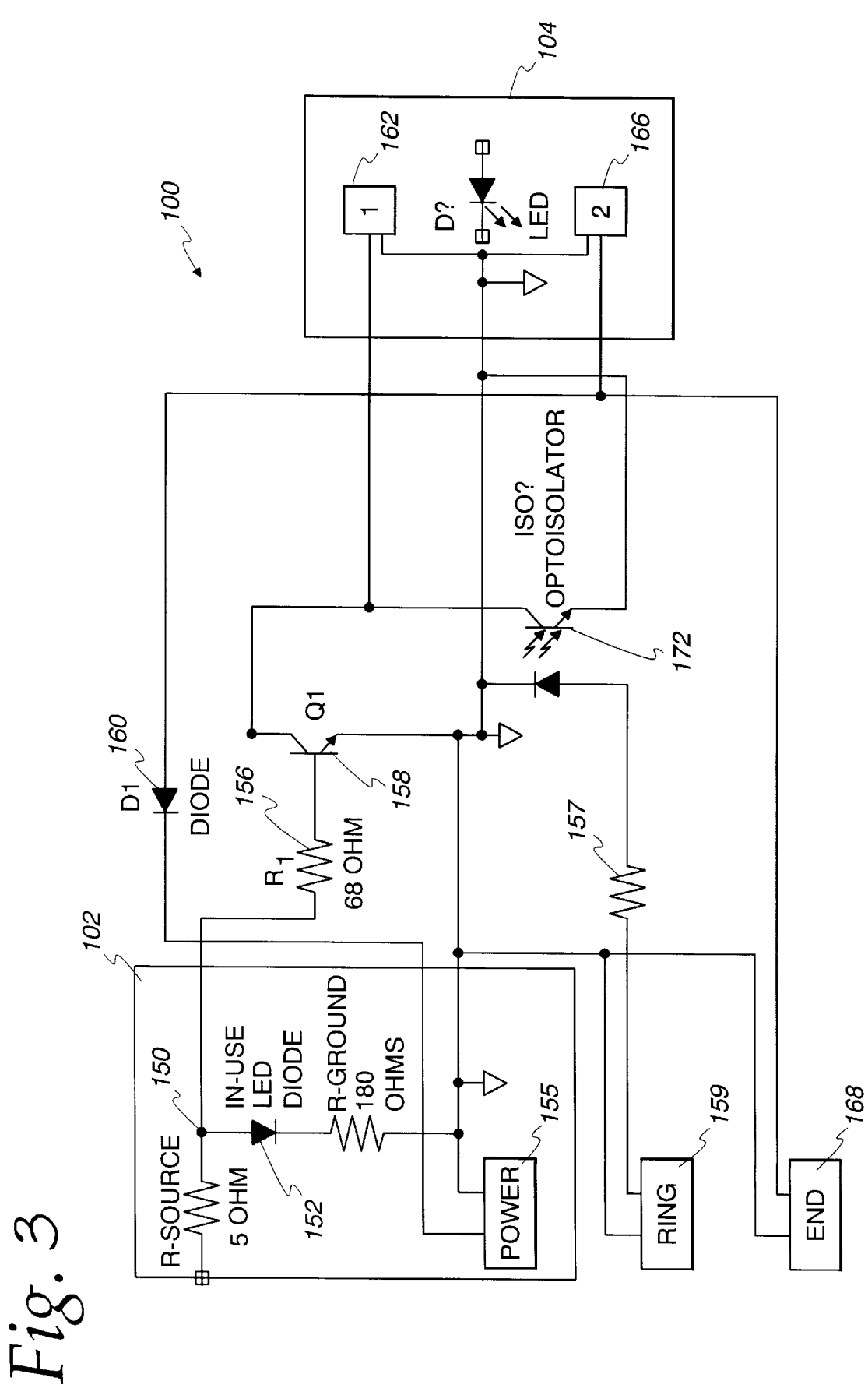
FIG. 3 is a schematic diagram illustrating the connection of the receiver to the in-use indicator.

In an alternate embodiment of the end button system described above, the need for an end signal decoder may be eliminated. In particular, a key overlay may be used that fits over the existing end button 168 and includes a wire which may be used to connect the end button 168 to the override button 166 of the transmitter 104. For example, a small rubber overlay may be constructed such that a contact switch is located within the overlay. The overlay may then be placed over the existing end button 168 on the cellular telephone 102 such that any press of the end button 168 sill cause the contact switch to close, thereby causing the override button 166 to send an override signal Referring to FIG. 3, as mentioned above, the receiver 106 is used for receiving the activate and override signals from the transmitter 104. Upon receipt of the signal, the receiver 106 may either open or close a control device such as a logical switch for controlling low current devices and/or a relay 108 for controlling a higher current device. The relay 108 is used, for example, in controlling the in-use indicator 114, among other things. In particular, when the transmitter 102 transmits an activate signal, the receiver 106 receives and decodes the signal. Depending upon the signal, a timer or pulse stretcher may be included to prevent the appearance of flashing lights, as may occur with a periodic signal such as the ring signal. Upon determining that an activate signal was received, the receiver 106 causes the relay 108 on the receiver 106 to close, thereby causing the in-use indicator 114 to light. The in-use indicator 114 may be any type of light source that is visible to other drivers outside the car and is preferably one that is simple, effective and inexpensive. Furthermore, if the in-use indicator 114 is required to be mounted external to the automobile by after market installers, it preferable that installation of the in-use indicator not require permanent or invasive modification of the vehicle.

Accordingly, referring to FIG. 4, an in-use indicator 114 is shown wherein an external portion of the indicator is mounted external to the car on the back windshield 217, without requiring the car to be permanently modified. In particular, the back windshield 217 of the car and the car itself are not permanently altered in any way, i.e. no holes are required to be cut through the windshield 217. The in-use detector 100, as mentioned above, illuminates when a cellular telephone is being used.

In an exemplary embodiment, the in-use indicator 114 includes an internal and an external portion. The external portion includes a light carrier 202, such as a fiber optic cable or light pipe, available from Radio Shack, that is positioned on the outside of the vehicle's back windshield 217. The carrier is sized such that the external portion of the in-use indicator 114 extends several inches above the roof of the car. This enables other drivers both in front and behind the vehicle carrying the in-use indicator 114 to see that the in-use indicator 114 is on. In particular, the output of the light carrier 202 is coupled to a warning sign 203 that, when lit, is visible from several car lengths away.

The warning sign 203 may be any indicator that lights or glows in response to receiving a light input, such as a plastic or glass cut out. The light carrier 202 is painted black or covered in a black material to prevent light from leaking through. As such, only the warning sign 203 should be visible. Although the warning sign 203 is shown in a particular shape, any shape is acceptable.

The light carrier's 202 input receives a light source from an indicator light supply 112, described below, that is placed on the inside of the vehicle's back windshield 217 directly in line with the light carrier's 202 input. In particular, the light supply 112 projects light through the windshield 217 and into the light carrier's 202 input.

Optionally, in another exemplary embodiment, the warning sign 203 and the external portions of the in-use indicator 114 may be located inside the vehicle. As such, there would be no portion of the in-use indicator 114 that would be located on the outside of the vehicle. In particular, the warning sign 203 would be attached to the inside of the windshield 217 using an adhesive, such as tape or glue. Because such an arrangenmnt would not allow for the warning sign 203 to extend above the roof of the vehicle, it is desired that the in-use indicator 114 be located as high up on the back windshield 217 as possible.

Referring to FIG. 5, the internal portion of the in-use indicator which includes the indicator light supply 112 for providing the light to the external in-use indicator 114 is shown. In particular, the indicator light supply 112 includes a light generating unit 204, a reflector 206 surrounding the light generating unit, a fan 208 for cooling the light generating unit 204, a housing 210 for housing the components and a light concentrator 212 for focusing the light produced by the light generating unit.

The light generating unit 204 may be any commonly available high intensity light source, such as a halogen bulb. The light generating unit 204 provides the actual source of light that is sent through the light carrier 202 to the in-use indicator 114. The light generating unit 204 may be surrounded by the reflector 206 to ensure that the most available amount of light is sent to the light carrier 202. In particular, the reflector 206 is a directional reflector that causes the light produced by the internal light source 204 to be formed to a point, thereby reducing the amount of diffraction caused by the light passing through clear objects such as, for example, the windshield 217 of a car.

Optionally, the reflector 206 may contain small holes or perforations to enable the heat from the light generating unit 204 to escape and for air to enter to prevent overheating of the system. The reflector 206, in addition to having a first opening 214 in which the light generating unit 204 may be inserted, also has a second opening 216 which is attached to the windshield 217 of the automobile in which the in-use system 100 is installed.

The second opening 216 in the reflector 206 provides the means through which the light exits to the light carrier 202 input It should be noted that the light carrier 202 input may be colored to enable the warning sign 203 appear to be a particular color when lit. A similar effect is achieved providing a colored light to the light carrier 202 input.

The concentrator 212 may be located either on the inside or the outside of the windshield 217, as long as it is placed between the opening of the reflector 212 and the light carrier 202 input. The concentrator 212 focuses and further reduces dispersion of the light generated by the light generating unit 204, thereby preventing light from diffracting and spreading through the windshield glass. The reflector 206 and the concentrator 212 may be fixed by an adhesive to the back windshield 217. The housing 210 is provided to hold the previously mentioned components of the indicator light supply 112. A second concentrator (not shown) may also be used, if desired. In particular, the second concentrator would be positioned opposite the first concentrator. For example, if the first concentrator is affixed on the inside portion of the windshield, the second concentrator would be located opposite the first concentrator, but on the outside portion of the windshield. Such a configuration may be used to further reduce glare and diffraction in and through the windshield.

Optionally, the housing 210 may be constructed with ventilating openings 211 or fins to enable air flow through the housing to cool the light supply 112 to ensure that the light generating unit 204 does not overheat beyond its rated optimal operating., temperature. Furthermore, a small fan 208, such as a 12VDC microfan 218 available from Radio Shack may be attached to the housing 210 to force air through light supply 112 to further ensure that the light generating 204 does not overheat. It should be noted that the power for operating the microfan 218 and the light generating unit 204 may be obtained from the vehicle battery (not shown).

Referring to FIG. 6, the in-use system is shown in operation. In particular, the user first turns on the cellular telephone 102 in step 100. If teal cellular telephone 102 is turned on but is outside the receiver's 106 range, as determined in step 102, then in step 104 no action is taken and the indicator 102 remains off. If, however, the cellular telephone 102 is within the receiver's 106 range when turned on, then in step 106 the in-use indicator 114 is turned on as well. Thus, if the cellular phone 102 is turned on but is not being used for communication when it is outside the receiver's 106 range and then subsequently brought within the receiver's 106 range, the in-use indicator 114 will not turn on. Similarly, even if the cellular telephone 102 is turned on and being used for communication outside the receiver's 106 range the in-use indicator 114 will not turn on. However, once the cellular telephone 114 is being used for communications and is then brought within the receiver's 106 range, the in-use indicator 114 will light.

In step 108 the system determines whether the override button 166 was pressed. If so, the in-use indicator 114 is turned off and the system is placed in arm mode. If the override button 166 is not pressed, the in-use indicator 114 will remain lit. In either case, the system then proceeds to step 112 and waits for the user to initiate or receive a telephone call.

In step 114, the system determines whether a call has been received or initiated on the cellular telephone 102. If not, the system returns to step 112 and continues to wait. However, if a call is initiated or received on the cellular telephone 102, the in-use indicator 114 turns on. In step 118 the system determines whether the override button 166 is pressed. If so, the system determines in step 120 if the telephone remains in use. If the telephone is no longer in use, the system returns to step 110. However, if the phone is still in use when the override button 166 is pressed, then in step 126 the keypress is ignored and the call continues and returns to step 118.

If in step 118 the system determines that the override button 166 was pressed, it then determines in step 122 whether the end button 168 was pressed. If the end button 168 was not pressed, -the call continues in step 128 and returns to step 118. If however, the end button 168 was pressed, then in step 124 the call is terminated and the in-use indicator 114 is turned off. The system then returns to step 112 to wait for the user to initiate or receive another call.

Obviously, many modifications and variations of the present invention are possible in light of the above teachings. Thus, it is to be understood that, within the scope of the amended claims, the invention may be practiced otherwise than as specifically described above.

What is claimed is:

1. A cellular phone in-use indicator system for use on a vehicle, comprising:
    an in-use signal source operatively coupled to a cellular telephone for generating an in-use signal indicating that said cellular phone is in use;
    a transmitter electrically coupled to said cellular telephone for transmitting said in-use signal by way of a wireless link;
    a receiver disposed away from said cellular phone for receiving said in-use signal from said transmitter; and
    an indicator disposed away from said cellular phone responsive to said receiver receiving said in-use signal for visually indicating that said cellular telephone is in use to persons outside the vehicle while said vehicle is moving.

2. The system as recited in claim 1 further including an override switch for preventing said in-use indicator from visually indicating that said cellular telephone is in use.

3. The system as recited in claim 2, further including an override lockout system for disabling said override switch when said cellular telephone is in use.

4. The system of claim 1 wherein said indicator includes an external portion and an internal portion, said internal portion being attached to the interior of the vehicle and said external portion being attached to the exterior of the vehicle.

5. The system of claim 4, wherein said internal portion, of said indicator includes a light generating unit.

6. The system of claim 5 wherein said external portion of said indicator captures and transports the light generated by said light generating unit of said internal portion.

7. The system of claim 4 wherein said internal portion of said indicator is optically coupled to said exterior portion of said indicator.

8. The system of claim 1 wherein said in-use signal is a radio frequency signal.

9. The system of claim 1 wherein said in-use signal is an infra-red signal.

10. The system of claim 1 wherein said indicator includes one or more light carriers.

11. The system of claim 10 wherein said one or more light carriers includes one or more fiber optic cables.

12. The system of claim 10 wherein said one or more light carriers includes one or more light pipes.

13. The system of claim 1 wherein transmitting a send signal from said cellular phone will activate said in-use indicator system.

14. The system of claim 1, wherein transmitting an end signal from said cellular phone will deactivate said in-use indicator system.

15. The system of claim 1, wherein said receiver includes one or more control devices for disabling and enabling electrical devices.

16. A cellular phone in-use indicator system for use with a cellular phone in a vehicle, comprising:
    a transmitter electrically coupled to said cellular telephone for transmitting an in-use signal when said cellular telephone is in-use;
    a receiver remote from said cellular phone for receiving said in-use signal; and
    an indicator responsive to said receiver receiving said in-use signal for visually indicating to persons outside the vehicle while said vehicle is moving that said cellular telephone is in-use.

17. A method for use in a vehicle for indicating to persons outside the vehicle that a cellular telephone is in-use, comprising the steps of:
    generating and transmitting an in-use signal when said cellular telephone is in use;
    receiving said in-use signal remote from said cellular phone; and
    visually indicating to persons outside the vehicle while said vehicle is moving that said cellular telephone is in use in response to said receiving step.

18. A cellular phone in-use indicator system for use on a vehicle, comprising:
    a receiver in a vehicle for detecting an RF ring request signal from a cellular tower located remote from said vehicle;
    an indicator responsive to said receiver detecting said RF ring request signal and visually indicating to persons outside the vehicle while said vehicle is moving that said cellular telephone is in use.

19. The system of claim 18, further including a timer for preventing said RF signal to cause said in-use indicator to blink.

* * * * *